(12) United States Patent
Kaminitz et al.

(10) Patent No.: US 9,858,703 B2
(45) Date of Patent: Jan. 2, 2018

(54) SYSTEM, DEVICE AND METHOD FOR PROVIDING USER INTERFACE FOR A VIRTUAL REALITY ENVIRONMENT

(71) Applicant: Facebook, Inc., Menlo Park, CA (US)

(72) Inventors: Kobi Kaminitz, Tel Aviv (IL); Nadav Grossinger, Yosef (IL); Moshe Meyassed, Kadima (IL); Nitay Romano, Geva Binyamin (IL)

(73) Assignee: Facebook, Inc., Menlo Park, CA (US)

( * ) Notice: Subject to any disclaimer, the term of this patent is extended or adjusted under 35 U.S.C. 154(b) by 110 days.

(21) Appl. No.: 14/975,492

(22) Filed: Dec. 18, 2015

(65) Prior Publication Data

US 2016/0180574 A1 Jun. 23, 2016

Related U.S. Application Data

(60) Provisional application No. 62/093,490, filed on Dec. 18, 2014.

(51) Int. Cl.
| | |
|---|---|
| *G09G 5/00* | (2006.01) |
| *G06T 15/00* | (2011.01) |
| *G06T 11/60* | (2006.01) |
| *G06T 19/00* | (2011.01) |
| *H04N 5/225* | (2006.01) |
| *H04N 5/33* | (2006.01) |

(Continued)

(52) U.S. Cl.
CPC ............ *G06T 15/005* (2013.01); *G06F 3/011* (2013.01); *G06F 3/017* (2013.01); *G06F 3/0304* (2013.01); *G06T 11/60* (2013.01); *G06T 19/006* (2013.01); *H04N 5/2226* (2013.01); *H04N 5/2256* (2013.01); *H04N 5/33* (2013.01)

(58) Field of Classification Search
None
See application file for complete search history.

(56) References Cited

U.S. PATENT DOCUMENTS 7,440,590 B1 * 10/2008 Hassebrook ....... G01B 11/2513
345/582
8,957,835 B2 * 2/2015 Hoellwarth .......... G02B 27/017
345/8

(Continued)

FOREIGN PATENT DOCUMENTS

WO WO 2011/106201 A2 9/2011
WO WO 2013/088442 A1 6/2013

OTHER PUBLICATIONS

PCT International Search Report and Written Opinion, PCT Application No. PCT/US2015/066909, dated Apr. 8, 2016, 16 pages.

*Primary Examiner* — M Good Johnson
(74) *Attorney, Agent, or Firm* — Fenwick & West LLP

(57) ABSTRACT

A device connectable to a near eye display or to a virtual reality headset and to a portable computing platform having a processor is provided herein. The device may include: an illuminator configured to illuminate a proximity of a user wearing the headset or the near eye display with patterned light; and an IR camera configured to capture reflections of said patterned light coming from at least one object located in the proximity of the user, wherein the processor is configured to: establish data and power connection between the device and said portable computing platform and said near eye display; and generate a depth map of said object based on the reflections.

23 Claims, 8 Drawing Sheets

(51) Int. Cl.
  *G06F 3/01* (2006.01)
  *G06F 3/03* (2006.01)
  *H04N 5/222* (2006.01)

(56) References Cited

U.S. PATENT DOCUMENTS

| | | | |
|---|---|---|---|
| 8,970,960 B2* | 3/2015 | Yu | G06F 3/011 |
| | | | 348/115 |
| 9,047,698 B2* | 6/2015 | Maciocci | G06F 3/011 |
| 9,613,423 B2* | 4/2017 | Dixon | H04N 5/33 |
| 2008/0252556 A1 | 10/2008 | Tseng et al. | |
| 2011/0141306 A1* | 6/2011 | Nakano | H04N 13/025 |
| | | | 348/222.1 |
| 2011/0213664 A1* | 9/2011 | Osterhout | G02B 27/017 |
| | | | 705/14.58 |
| 2011/0286676 A1* | 11/2011 | El Dokor | G06F 3/017 |
| | | | 382/225 |
| 2011/0292347 A1 | 12/2011 | Zhang et al. | |
| 2012/0127284 A1 | 5/2012 | Bar-Zeev et al. | |
| 2012/0195949 A1 | 8/2012 | Miuchi et al. | |
| 2013/0088726 A1* | 4/2013 | Goyal | G01S 7/4866 |
| | | | 356/634 |
| 2013/0250087 A1* | 9/2013 | Smith | G06F 3/013 |
| | | | 348/78 |
| 2013/0281207 A1 | 10/2013 | Lyons et al. | |
| 2014/0184496 A1* | 7/2014 | Gribetz | G02B 27/017 |
| | | | 345/156 |
| 2015/0042680 A1 | 2/2015 | Grossinger et al. | |
| 2015/0198716 A1 | 7/2015 | Romano et al. | |
| 2015/0234193 A1* | 8/2015 | Lyons | G02B 27/0172 |
| | | | 345/174 |
| 2016/0078679 A1* | 3/2016 | Maximo | G06F 3/0484 |
| | | | 345/633 |
| 2016/0117860 A1* | 4/2016 | Fei | G06F 3/017 |
| | | | 345/419 |
| 2016/0187974 A1* | 6/2016 | Mallinson | G06F 3/014 |
| | | | 463/32 |
| 2017/0059305 A1* | 3/2017 | Nonn | G01B 11/2513 |

* cited by examiner

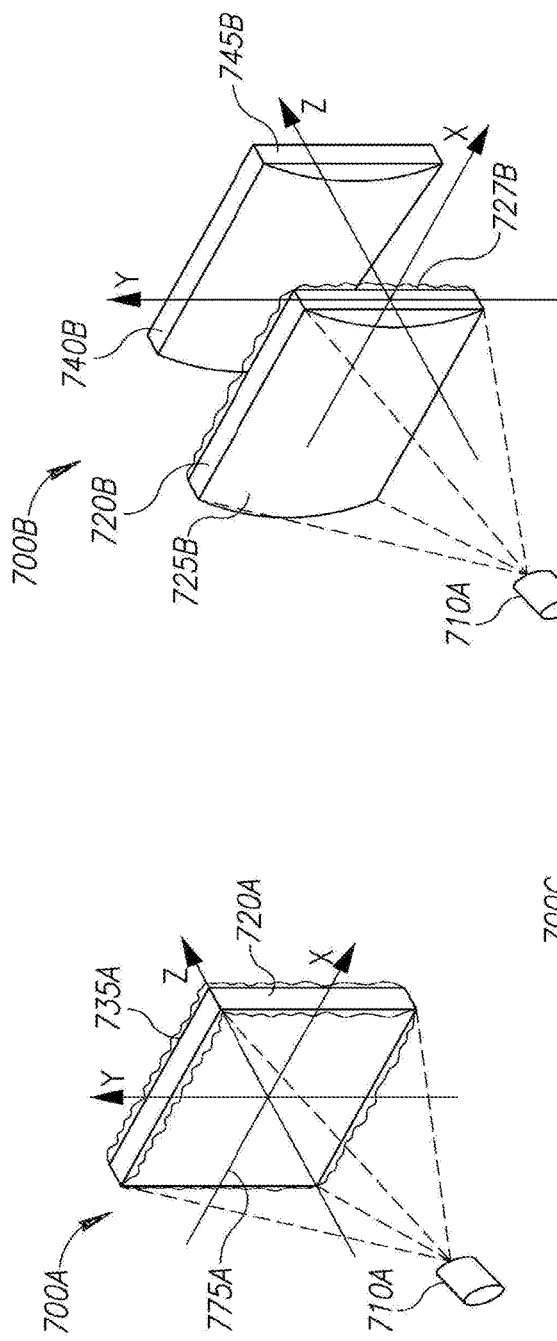
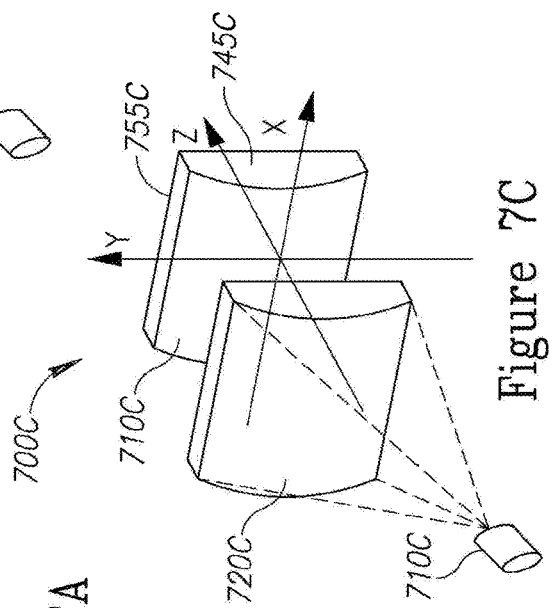

US 9,858,703 B2

SYSTEM, DEVICE AND METHOD FOR PROVIDING USER INTERFACE FOR A VIRTUAL REALITY ENVIRONMENT

TECHNICAL FIELD

The present invention relates generally to virtual reality (VR) environment and more particularly, to a device and method that enables natural interfacing with a VR environment using bodily gestures and/or postures.

BACKGROUND OF THE INVENTION

Prior to the background of the invention being set forth, it may be helpful to set forth definitions of certain terms that will be used hereinafter.

The term 'Virtual Reality' (VR) as used herein is defined as a computer-simulated environment that can simulate physical presence in places in the real world or imagined worlds. Virtual reality could recreate sensory experiences, including virtual taste, sight, smell, sound, touch, and the like. Many traditional VR systems use a near eye display for presenting a 3D virtual environment.

The term 'Augmented Reality' (AR) as used herein is defined as a live direct or indirect view of a physical, real-world environment whose elements are augmented (or supplemented) by computer-generated sensory input such as sound, video, graphics or GPS data. It is related to a more general concept called mediated reality, in which a view of reality is modified (possibly even diminished rather than augmented), by a computer.

The term 'near eye display' as used herein is defined as a device which includes wearable projected displays, usually stereoscopic in the sense that each eye is presented with a slightly different field of view so as to create the 3D perception.

The term 'virtual reality headset' sometimes called 'goggles', is a wrap-around visual interface to display computer output. Commonly the computer display information is presented as a three-dimensional representation of real-world environments. The goggles may or may not include optics beyond the mere structure for holding the computer display (possibly in a form of a smartphone).

FIG. 1 shows a traditional VR system according to the prior art in which user 10 wears a head mounted stereoscopic display 12 (e.g., Oculus Rift™) which projects a synthetic image 16 of a scene onto each eye of user 10. Usually in VR, each eye receives the synthetic image 16 at a slightly different angle so as to create a 3D perception in the brain of the user (for the sake of simplicity, the stereoscopic pair is not shown). Additionally, head mounted display 12 may be provided with sensors such as accelerometers or gyros (not shown) that may detect in real time the viewing angle or gaze direction of the user. As a result, the VR system may adjust image 16 to fit the new head orientation of the user. As this adjustment is carried out in real time, an illusion of the virtual reality imitating the head movements in the real world may be achieved.

Beyond tracking the view point of the user as explained above, VR systems provide a further interaction with the virtual world via input devices such as joystick 14 (or mouse, touchpad, or even a keyboard). Such an input device may enable user 10 to perform various actions. For example a cursor 18 indicated on image 16 over the VR scene may be controlled by user 10 via joystick 14. Naturally, the use of such traditional input devices undermines the overall VR user experience. In addition, the use of a cursor 18 limits the user experience to standard computer-user interface known from personal computers.

SUMMARY OF THE INVENTION

According to some embodiments of the present invention, a user may wear a near eye display on which the device according to embodiments of the present invention may be mounted, possibly as an add-on. The device may include an illuminator (e.g., laser transmitter) and a capturing unit (e.g., camera) whose field of view is wide enough to include any surrounding of the user. In operation, the near eye display is configured to project a synthetic scene onto both eyes of user. The illuminator may illuminate a vicinity of the user and/or the user with patterned light. Reflections of the patterned light may be captured by capturing device and then analyzed by a computer processor which may be located, for example, in a smart telephone which is part of the near eye display, to yield a three dimensional visual representation indicative of the position and orientation of an object such as the hands of the user, as changed in real-time.

In another embodiment, the device may benefit from the camera of the smart telephone which may be configured by dedicated software to capture images of the hands or other gesturing object controlled by the user. At the same time, the processor of the smart telephone is configured to compute a depth map of the same hands or gesturing object based on data captured by the device. The processor is further configured to merge the data of the depth map and the visual images into 3D images of the hands that can be imported into a corresponding location at the virtual image. This way, the actual hands of user are being imported, while maintaining their 3D attributes, into the VR scene.

These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 7A, 7B, and 7C are block diagrams of possible patterned light generators in accordance with embodiments of the present invention.

DETAILED DESCRIPTION OF THE INVENTION

Figure 1:
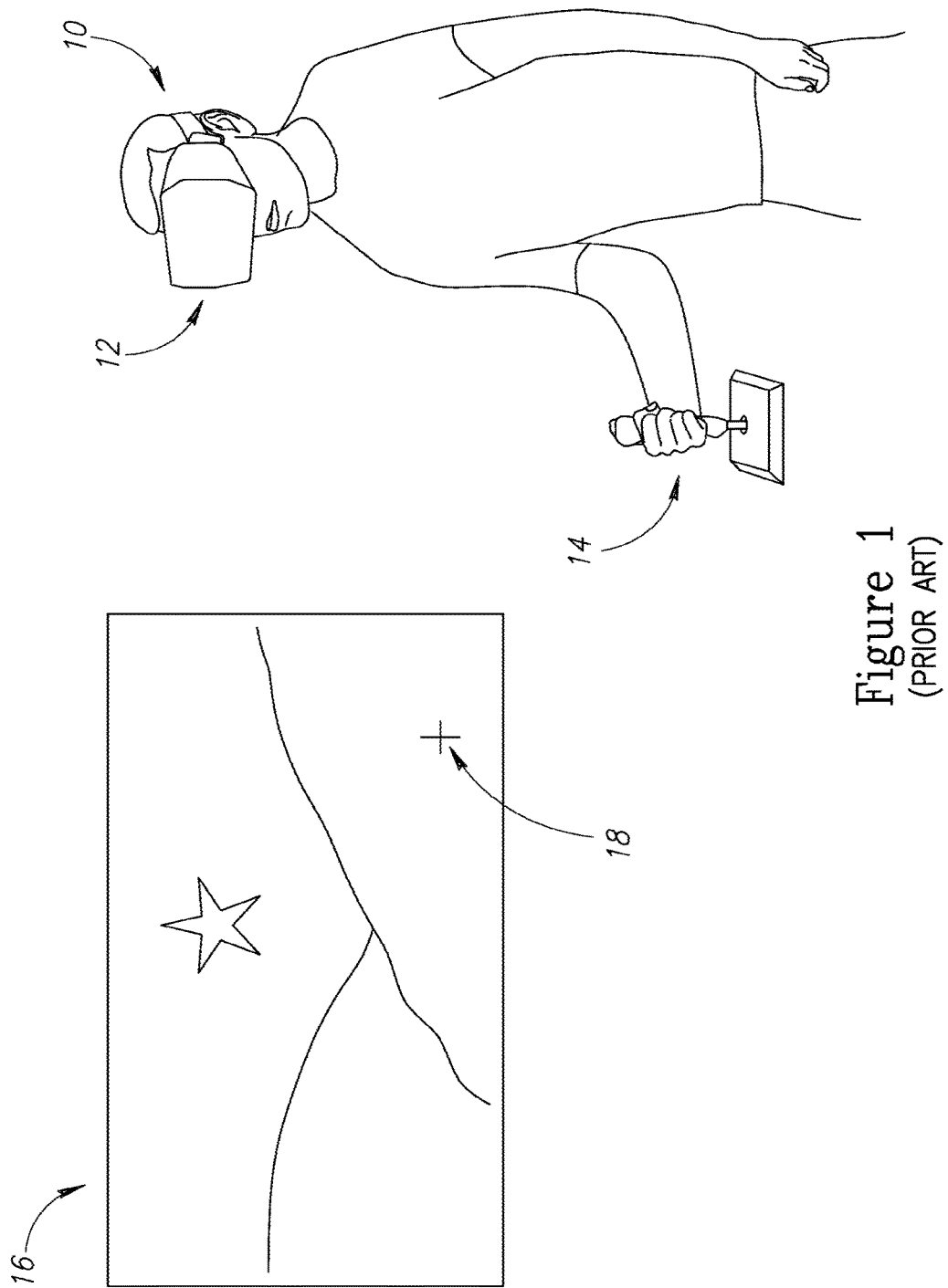
FIG. 1 is a diagram illustrating a virtual reality system and its environment according to the prior art.

With specific reference now to the drawings in detail, it is stressed that the particulars shown are by way of example and for purposes of illustrative discussion of the preferred embodiments of the present technique only, and are presented in the cause of providing what is believed to be the most useful and readily understood description of the principles and conceptual aspects of the present technique. In this regard, no attempt is made to show structural details of the present technique in more detail than is necessary for a fundamental understanding of the present technique, the description taken with the drawings making apparent to those skilled in the art how the several forms of the invention may be embodied in practice.

Before at least one embodiment of the present technique is explained in detail, it is to be understood that the invention is not limited in its application to the details of construction and the arrangement of the components set forth in the following description or illustrated in the drawings. The present technique is applicable to other embodiments or of being practiced or carried out in various ways. Also, it is to be understood that the phraseology and terminology employed herein is for the purpose of description and should not be regarded as limiting.

Figure 2:
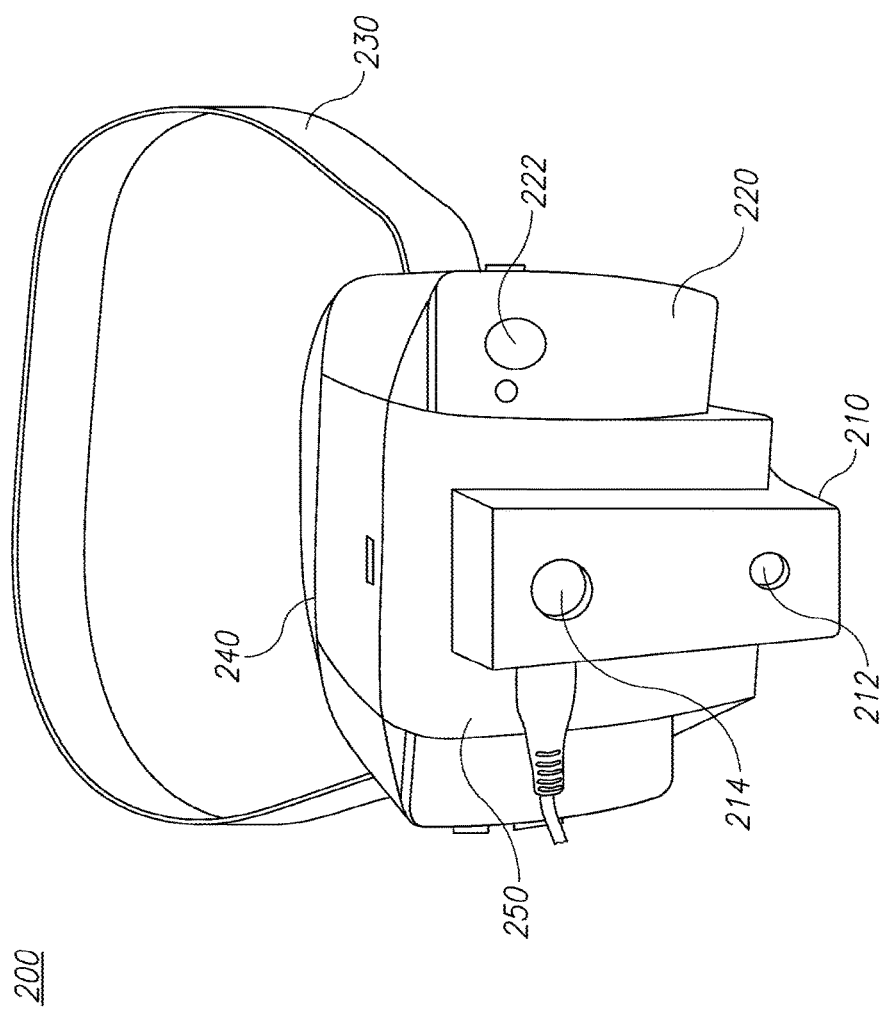
FIG. 2 is perspective diagram illustrating a device attached to its immediate environment according to some embodiments of the present invention.

FIG. 2 is a perspective view of a device 210 in accordance with some embodiments of the present invention packed and attached to its immediate environment 200 being a virtual reality (VR) headset 240 (goggles) configured for use with a mobile device such as smartphone 220. Device 210 may include an illuminator (e.g., laser transmitter) such as an infra-red (IR) pattern illuminator 212, a camera such as an IR camera 214. Device 210 may further include a pre-processor (not shown) configured to carry out initial image processing. Device 210 is further configured to physically and electronically interface with both smartphone 220, and the near eye display 240 that form together the VR headset. Such a VR headset (goggles) may be arranged for use with smartphones, as is known in the art, and usually includes a optics which can transmit the display of the smartphone (not shown—facing opposite side), a sleeve 250 for accommodating smartphone 220 which may be include a camera 222, and a strap 230 for fastening the VR headset (goggles) onto the head of the user. It is understood however that device 210 may interface with near eye displays such as Samsung Gear VR™ and Oculus Rift™.

In operation, device 210 may serve as a means for enhancing VR headset by adding the ability to view, within the VR scene, 3D images of the user's hands or other body parts. This is carried out by device 210 which provides the necessary hardware to be attached to a near eye display and the necessary software to be executed on the VR device processor for controlling the device and analyzing the data captured by it. Ergonomically, some embodiments of the present invention eliminate the need for a VR specific device and will further save costs.

Advantageously, device 210 provides merely the minimal hardware such as the patterned light illuminator and the camera for capturing the reflections of the pattern. The interface connecting to the smart telephone 220 may supply the necessary power and transfer the data acquired to the smart telephone 220, where all the processing is being carried out, taking advantage of its computing power. Thus, in accordance with some embodiments of the present invention, installing a VR system becomes very easy and using off-the-shelf components such as smart telephones and goggles.

Figure 3:
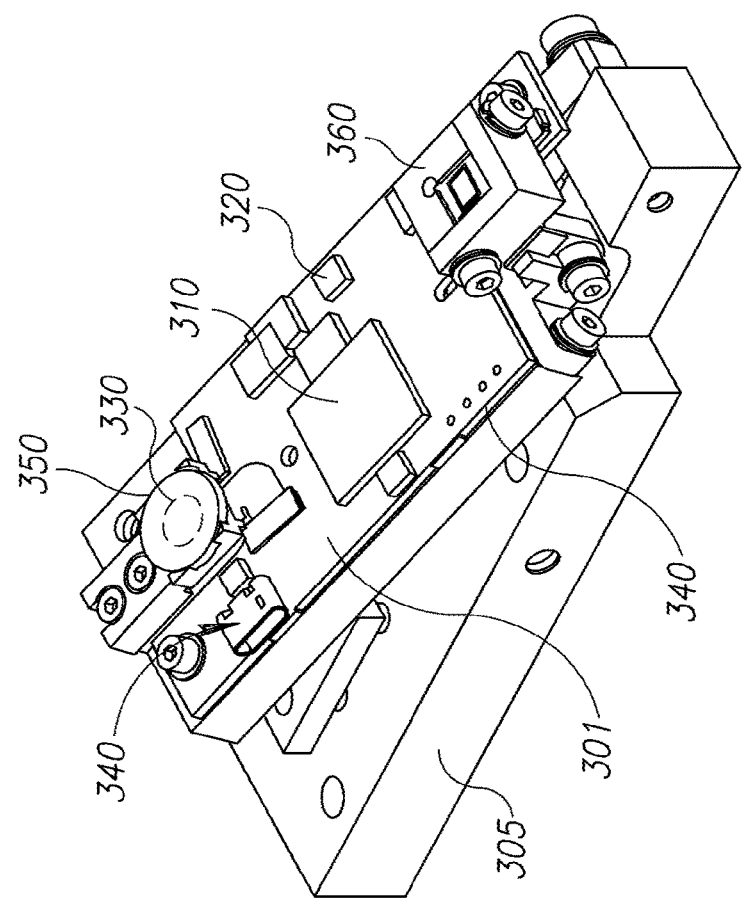
FIG. 3 is a diagram illustrating a non-limiting implementation of the devices according to some embodiments of the present invention.

FIG. 3 is a mechanical diagram of a non-limiting exemplary implementation of the device according to some embodiments of the present invention. A perspective view shows a printed circuit board (PCB) 301 on which components are installed and which may be physical attached to a base unit 305. Main components of the exemplary implementation are the laser transmitter 360 coupled to a laser driver 320 configured to feed the laser transmitter 360 with sufficient power, and possible modulation. A camera 330, possibly a VGA camera, is configured to receive the reflections of the patterned light. According to one embodiment, the PCB may include an IR filter 350 which covers camera 330. In some embodiments, data such as data related to pattern light reflections received by camera 330 is being initially processed for example by signal processor 310 and then conveyed via ports such as USB ports 340 to a third party processor (not shown), for example the data may be transferred over USB protocol into the USB port of a smart telephone and interact with an application executed on the processor of the smart telephone. The power for the device may also be provided via a USB port 340. A socket for an additional camera as well as various integrated circuits (IC), such as initial image processor (IIP), are also attached to the PCB and shown here.

In some embodiments, the camera 330 may be omitted from the device and the camera of the external portable computing platform (smartphone) may be used instead. The inventors have tested several prototypes of the device and a low power consumption of 1 Watt for the device with camera 330 has been measured, while without camera 330, an even lower power consumption of 550 milliwatt was measured.

Figure 4:
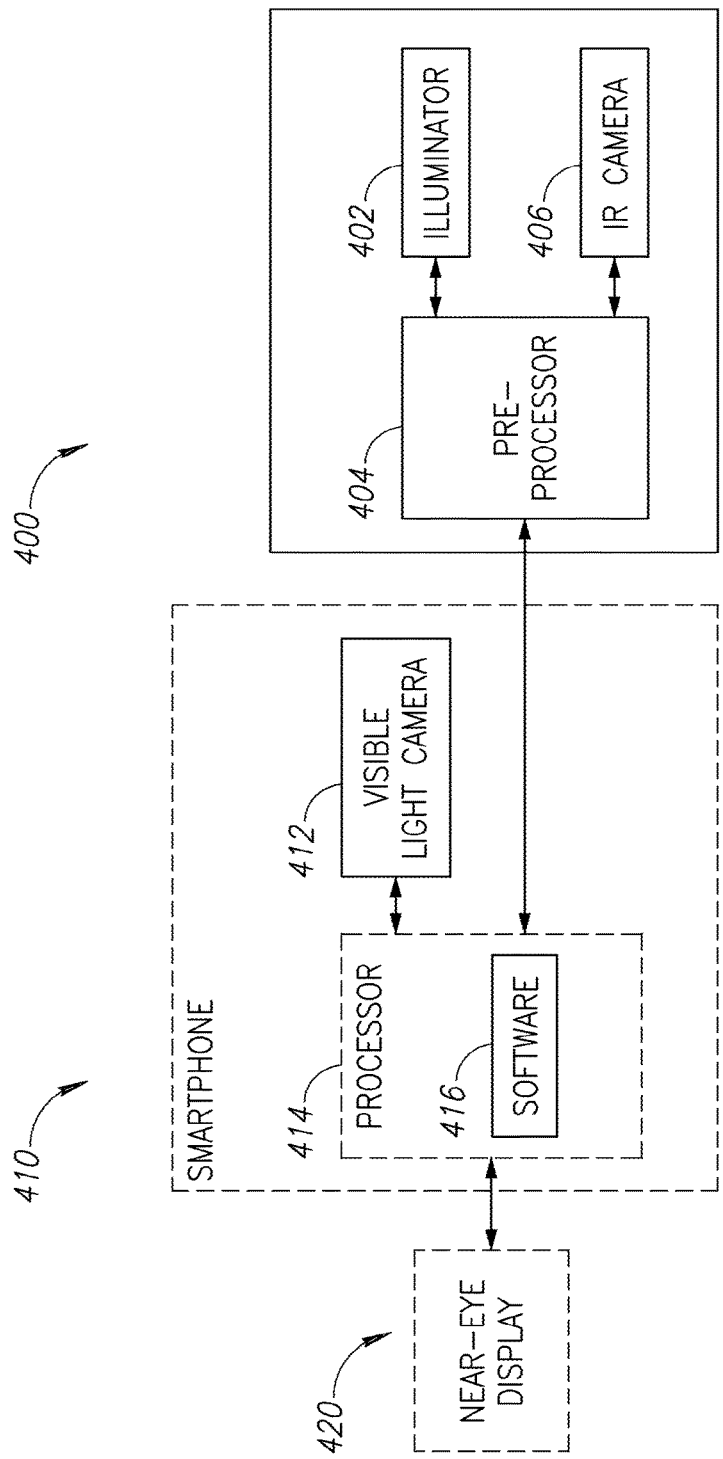
FIG. 4 is a block diagram illustrating the device according to some embodiments of the present invention.

FIG. 4 is block diagram illustrating the architecture of the device and its immediate environment as explained above, according to some embodiments of the present invention. Device 400 may include an IR illuminator configured to illuminate the scene with patterned light; an IR camera 406 configured to receive the reflections of the patterned light and a pre-processor configured to carry out initial processing of data from IR camera 406. Device 400 is further configured to interface with a portable computing platform such as a smartphone 410 which may include a processor 414 and software modules associated with device 400 which are executed by processor 414. Smartphone 410 is further connected to a near eye display 420 configured to present a user with synthetic scene and further with 3D images of bodily parts (e.g., hands) of the user. It should be noted that the platform can be also a laptop personal computer (PC), a tablet PC, and the like.

In operation, the reflected IR pattern illuminated by illuminator 402 is captured by IR camera 406 and after some initial processing by pre-processor 404 the data is conveyed to the processor 414 of smartphone 410 together with the dedicated software 416, processor 414 generates a depth map of body parts of the user, based on the reflected pattern. A visible light camera 412 may be configured to capture 2D color images of the same body parts (e.g., hands) of the user that were illuminated with the patterned light. Thus, processor 414 may use both the depth map and the 2D color images of the body parts, to generate 3D color images of the captured body parts. Finally, processor 414 is configured to superimpose the generated 3D color images of the captured body parts onto the synthetic VR scene so that the user will be able to view, via near eye display 420 both the VR scene and his or her captured body parts (e.g., hands) as 3D color images, positioned and orientated as they are in real life.

Figure 5B:
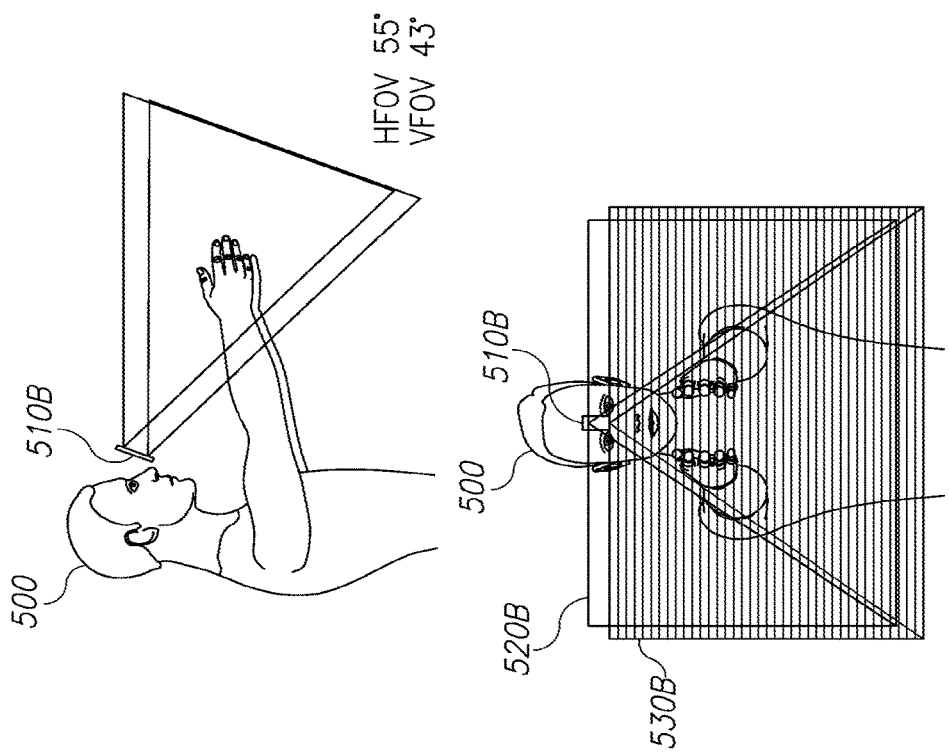
FIGS. 5A and 5B are diagrams illustrating an aspect in accordance with embodiments of the present invention.
Figure 5A:
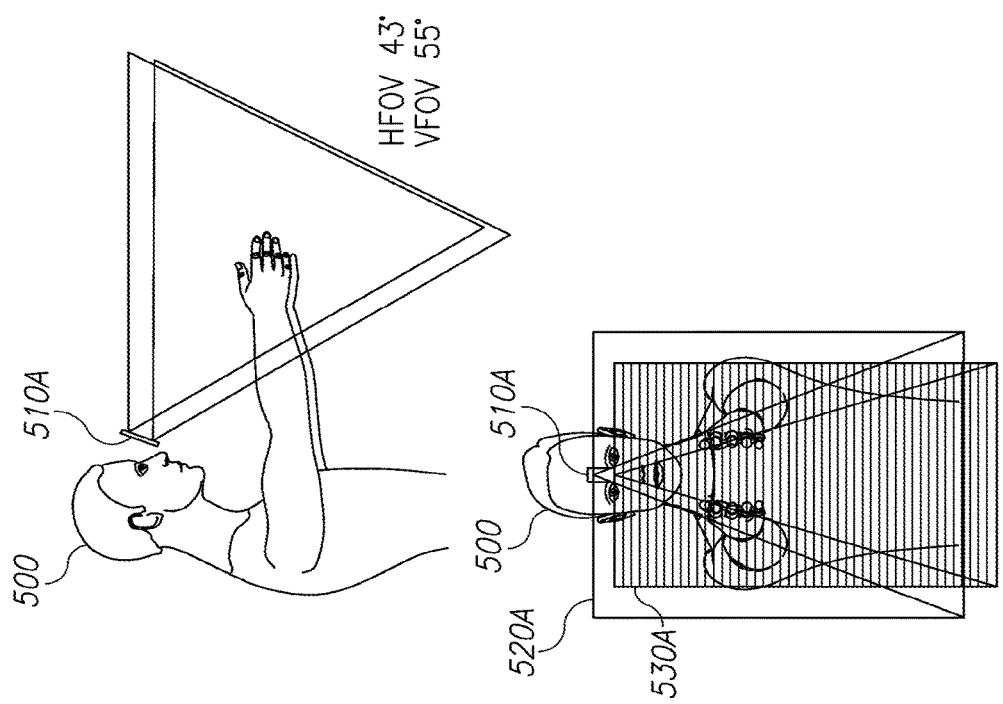

FIGS. 5A and 5B are diagrams illustrating an aspect in accordance with some embodiments of the present invention. User 500 is seen wearing device 510 in accordance with some embodiments of the present invention. It is noted that only the device is shown here, for the sake of simplicity, without its accompanying headset. FIG. 5A illustrates the field of view of both the illuminator and the IR camera of device 510. The area covered by the patterned light 530A is substantially overlapping the area covered by the IR camera 520A shown in a portrait configuration. FIG. 5B show similar overlapping field of views but in a landscape configuration where IR camera is rotated 90° and the illuminator may rather also be rotated or alternatively its pattern generating surface is being stretched to become landscape in nature. The use of landscape orientation is advantageous for VR application where the entire span of the hands is important for enabling natural postures and gestures to be carried out and monitored. During experimentations, the inventors have discovered that a horizontal field of view of approximately 43° and a vertical field of view of approximately 55° yield good results for embodiments of the present invention in portrait configuration. Similarly a horizontal field of view of approximately 55° and a horizontal field of view of approximately 43° yield good results for landscape configuration. It is understood that other field of views may be used with other devices in accordance with other embodiments of the present invention.

Figure 6:
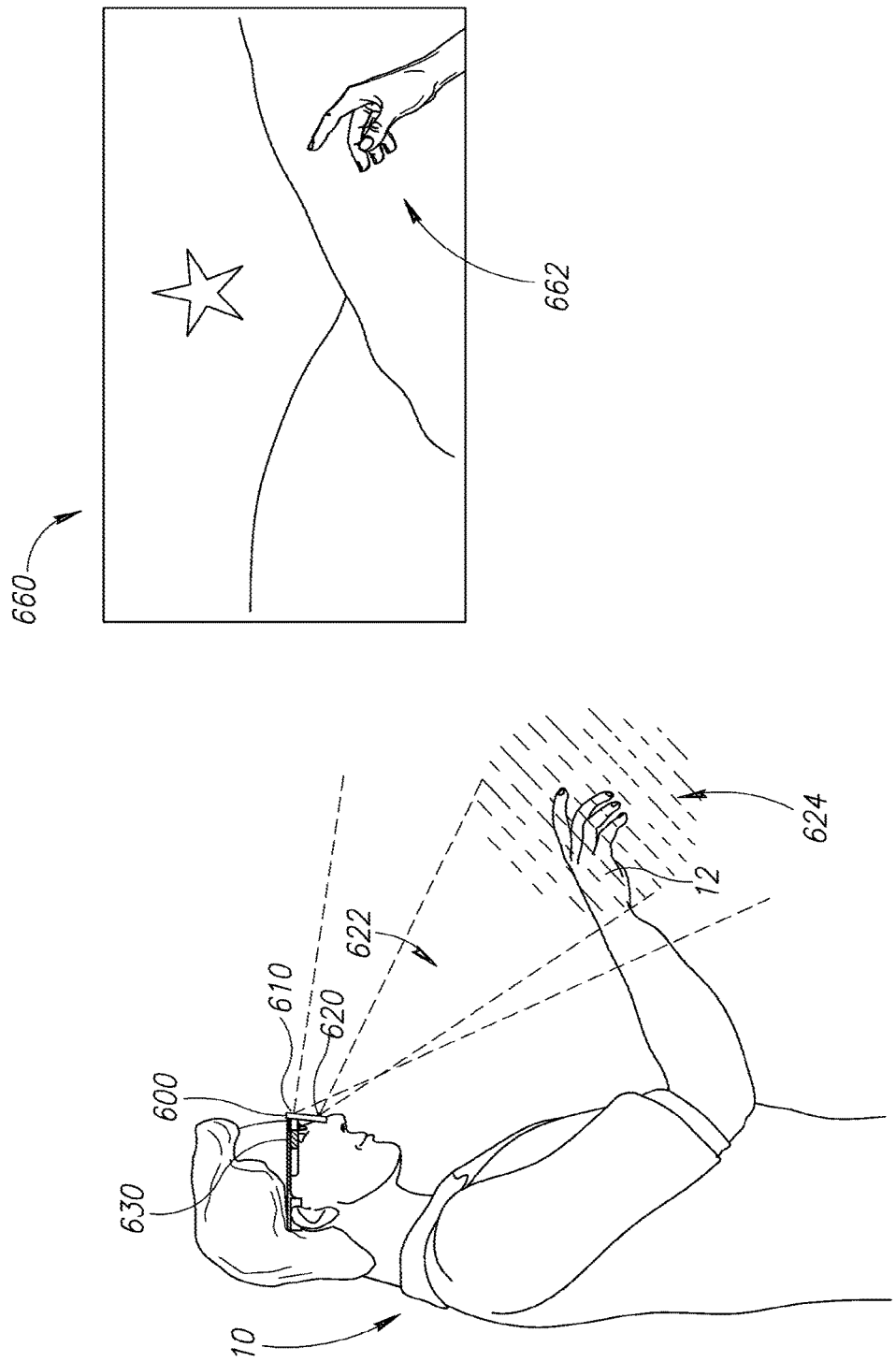
FIG. 6 is diagram illustrating a device operative in its immediate environment according to some embodiments of the present invention.

FIG. 6 is a schematic diagram illustrating the device at its usual environment according to embodiments of the present invention. User 10 wears a near eye display 630 on which device 600 may be mounted possibly as an add-on as explained above. Device 600 may include an illuminator (e.g., laser transmitter) 620 and a capturing unit (e.g., camera) 610 whose field of view is wide enough to include any surrounding of the user as explained above.

In operation, near eye display 630 is configured to project a synthetic scene onto both eyes of user 10. Illuminator 610 may illuminate a vicinity of user 10 with patterned light 624. Reflections of the patterned light may be captured by capturing device 610 and then analyzed by a computer processor (not shown here) which may be located, for example, on a smartphone attached to near eye display 630. A visible light camera of the smartphone (or alternatively a part of device 600) is configured to capture 2D images of a user's hands or other gesturing object controlled by user 10. At the same time, the processor of the smart telephone is configured to compute a depth map of the hands or gesturing object and then merge the data of the depth map and the visual images into 3D images of the hands 662 that can be imported into a corresponding location at the virtual image 660. This way, 3D images of the hands of user 10 are being superimposed, while maintaining their 3D attributes, onto the VR scene.

FIGS. 7A-7C are diagrams illustrating various embodiments implementing illuminator (the source of the patterned light) in a form of a multi-line pattern generator. As such it contains a laser source and optics which transforms the laser beam into a plurality of lines. For providing further details of how structured light can be implemented, by way of illustration only, the following applications are incorporated herein by reference in their entirety: U.S. patent application Ser. No. 13/497,586, WIPO Patent Application Publication number WO 2013088442, and U.S. Provisional Patent Applications Nos. 61/863,510, 61/894,471, and 61/926,476.

FIG. 7A illustrates a configuration of a pattern generator system 700A according to a first embodiment of the invention. System 700A may include a light source such as a laser diode light source 710A and a single optical lens element 120. The optical element 720A may provide the following three functions (not specifically in this order), thus generating a pattern such as multi-line pattern in the space or on a surface or object: a) Line generation, b) Multiplication, c) collimation.

According to a first embodiment of the invention, there is provided a single lens optical element 720A which includes at least two surfaces, a first optical surface 725A and a second optical surface 735A. In a first cross section, such as the Y-Z cross section of the first optical surface, the lens element 120 has a positive optical power. This positive optical power is used to collimate the laser light in the slow divergence section.

In a second cross sections, such as X-Z cross section of the first surface 725A or the second surface 735A of the lens, element 720A has a line generator. The line generator may be in the form of a positive optical power such as aspheric lens, cylindrical lens or diffractive element or a negative optical surface or a combined negative/positive surface, etc. The single optical element 720A further includes a beam splitting element formed in a first cross section such as the Y-Z cross section of the second surface 735A.

FIG. 7B, illustrating a configuration of a pattern generator system 700B according to a second embodiment of the invention. The system 700B may include a light source such as a laser diode light source 710B and two optical lens elements, a first lens element 720B and a second lens element 740B. In at least one cross section (e.g., the fast or the slow axis), such as in a Y-Z cross section of a first surface 725B of the first lens, element 720B has a positive optical power, and in the other cross section (i.e., the X-Z cross section) of the first optical element, a multiplication function is provided in the second surface 727B for splitting the beam provided by the laser source 710B.

Adjacent or in the proximity to the first lens element 720B, a second lens element is provided 740B configured to generate a pattern such as a line pattern. The line pattern may be provided at a first cross section of a first surface 745B of the second element 740B for example in a Y-Z cross section of the first surface 745B.

FIG. 7C illustrates a configuration of a pattern generator system 700C according to a third embodiment of the invention. The system 700C may include a light source such as a laser diode light source 710C and two optical lens elements, a first lens element 720C and a second lens element 730C. In at least one cross section, such as in a Y-Z cross section of a first surface 755C of the first lens, element 745C has a positive optical power.

Adjacent or in the proximity to the first lens element 720C, there is provided a second lens element 740C for generating two functions: 1) Line generation, and 2) Multiplication. For example, a pattern such as a line pattern is formed at a first cross section (i.e., Y-Z cross section) of the first surface and multiplication function in the other cross section (i.e., X-Z cross section) of the second surface 755C.

According to some embodiments of the invention, the first and second elements may be coupled to one another by a welding of gluing techniques known in the art.

According to another embodiment of the invention, the diffractive surface of the second lens element faces the surface of the first lens element to protect the sensitive diffractive surface and to prevent any contact of unwanted external element with the diffractive surface.

According to some embodiments of the invention, the line generation function may be formed using a positive optical surface, a combined negative/positive surface or a diffractive surface.

According to an exemplary embodiment, the tracking of the movement of the hand is carried out, using a light pattern designed to enable detection of hand movement, such as fine movements of fingers and thumbs. The use of structured light may be, for instance, as disclosed in WIPO PCT Patent Application Publication No. WO 2013/088442, which is incorporated herein by reference in its entirety.

The specifically designed light pattern allows the tracking of the movement, even in bi-dimensional video data, which unlike three dimensional depth map, does not provide for easy separation of the hands from the rest of the body.

Optionally, the light pattern may be specifically designed to track movement of the hand's digits in a bi-dimensional video data (e.g., video images streamed from a regular video camera). More specifically, the light pattern may be designed to enable detection and tracking of digits (i.e., fingers and thumb) as well as palm, in the bi-dimensional video data, according to distortions of the pattern by the digits.

Optionally, the light pattern has a continuous feature in a first direction (say, the X-axis) and a non-continuous (say, periodic) feature in a direction substantially perpendicular to the first direction (say, the Y-axis). In one example for such a pattern, the light pattern includes several stripes arranged in parallel (or in near parallel) to each other.

Figure 8:
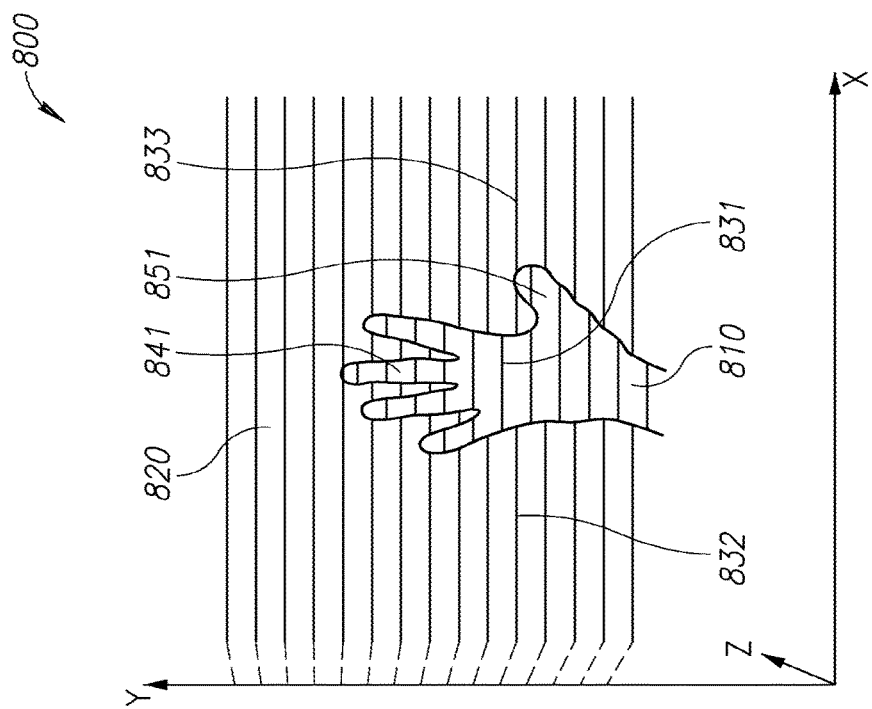
FIG. 8 is a diagram illustrating an aspect of a patterned light in accordance with embodiments of the present invention.

FIG. 8 is a diagram illustrating an aspect of a patterned light in accordance with embodiments of the present invention.

Following below is a more detailed explanation relating to how the generated patterned light is used to track the gestures made by the user. According to an exemplary embodiment, a sensor (not shown here) may be positioned in a certain Y-axis distance, for example near a transmitter which projects the stripes pattern on the hand 810 and on the background 820 (say, a surface of a table the hand rests on, a wall, etc.). The position of the sensor is selected, so as to create a triangulation effect between the camera, the light projector and the light reflected back from the user's hand 810 and the background 820.

The triangulation effect causes discontinuities in the pattern at the points along a strip where there are significant depth shifts from an object projected with a light pattern. The discontinuities segment (i.e., divide) the strip into two or more strip segments, say a segment 831 positioned on the hand, a segment 832 position to the left of the hand and a segment 833 position to the right of the hand.

Such depth shift generated strip segments may be located on the contours of the user's hand's palm or digits, which are positioned between the camera and the user's body. That is to say that the user's digit or palm segments the strip into two or more strip segments. Once such a strip segment is detected, it is easy to follow the strip segment, to the strip segment's ends.

The device may thus analyze bi-dimensional video data, to generate clusters of strip segments. For example, the device may identify in the light pattern, a cluster of one or more strip segments created by segmentation of stripes by a digit of the hand, say a cluster 841 of four segments reflected from the hand's central finger. Consequently, the device tracks the movement of the digit, by tracking the cluster of strip segments created by segmentation of stripes by the digit, or by tracking at least one of the cluster's segments.

The cluster of strip segments created by segmentation (i.e., division) of stripes by the digit includes strip segments with an overlap in the X axis. Optionally, the strip segments in the cluster further have similar lengths (derived from the fingers thickness) or relative proximity in the Y-axis coordinates.

On the X-axis, the segments may have a full overlap for a digit positioned straightly, or a partial overlap for a digit positioned diagonally in the X-Y plane. Optionally, the device further identifies a depth movement of the digit, say by detecting a change in the number of segments in the tracked cluster. For example, if the user stretches the user's central digit, the angle between the digit and the plane of the light projector and camera (X-Y plane) changes. Consequently, the number of segments in the cluster 841 is reduced from four to three.

Optionally, the device further identifies in the light pattern, one or more clusters of one or more strip segments created by segmentation of stripes by a palm of the hand.

The cluster of strip segments created by segmentation of stripes by the palm includes an upper strip segment 831 which overlaps with the user hand's fingers strip segment clusters, in the X axis. The upper strip segment 831 overlaps the four finger clusters in the X-axis, but do not exceed beyond the minimum and maximum X value of the four finger clusters' bottom segments.

The cluster of strip segments created by segmentation of stripes by the palm further includes, just below segment 831, a few strip segments in significant overlap with the strip segment 831. The cluster of strip segments created by segmentation of stripes by the palm further includes longer strip segments that extend to the base of a strip segment cluster 851 of the user's thumb. It is understood that the digit and palm cluster's orientation may differ with specific hands positions and rotation.

Advantageously, the power consumption of the device is sufficiently reduced to enable a non-interrupted and continuous operation, even when the source power is limited as in the case with smartphones. As explained above, some embodiments of the invention utilize pattern generation based on interferences in which the energy is spatially diverted as opposed to prior art solutions which involve energy blocking. The use of interference bases pattern generation is more efficient energy-wise. As further explained above, the generation of the depth map is based segments of the reflections which enable a partial pattern processing which reduces the computational intensity. This also contributes to reducing the overall power consumption. In some embodiments, the autofocus feature of the smartphone can be used in order to provide initial data regarding the range of the object that is being projected with the pattern. This also contributes to lower power consumption. All of the above low power consumption features significantly contribute to making the interface of a smartphone and a near eye display as a VR headset, possible from power consumption perspective.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A device connectable to a virtual reality headset and to a portable computing platform having a processor, the device comprising:

an illuminator configured to illuminate a proximity of a user wearing the virtual reality headset with patterned light;

a camera configured to capture reflections of the patterned light coming from at least one object located at the proximity of the user; and a pre-processor configured to:
perform pre-processing of data related to the captured reflections; and
provide the pre-processed data to the processor of the portable computing platform, wherein the processor of the portable computing platform is configured to:
establish data and power connection between the device and the portable computing platform;
obtain the pre-processed data from the pre-processor; and
generate a depth map of the at least one object based on the pre-processed data.

2. The device of claim 1, wherein the illuminator and the camera are operating at an infra-red (IR) range.

3. The device of claim 1, wherein the processor is further configured to:
generate a 3D image of the at least one object, based on the depth map and 2D images of the at least one object; and
superimpose the 3D image of the at least one object on a virtual reality (VR) scene generated by the processor and viewable by the user.

4. The device of claim 3, wherein the portable computing platform further comprises a visible light camera configured to capture the 2D images of the at least one object.

5. The device of claim 3, further comprising a visible light camera configured to capture the 2D images of the at least one object.

6. The device of claim 3, wherein the processor is further configured to align the 3D image of the at least one object with a viewing angle of the VR scene by the user.

7. The device of claim 1, wherein a power consumption of the device is below approximately 1 Watt.

8. The device of claim 1, wherein the portable computing platform and the virtual reality headset are integrated as a single element.

9. The device of claim 1, wherein the processor is further configured to establish data and power connection between the device and the portable computing platform based on "Plug and Play".

10. The device of claim 1, wherein the at least one object is a body part of the user.

11. The device of claim 1, wherein the portable computing platform is selected from a group comprising: a smartphone, a laptop personal computer (PC), and a tablet PC.

12. The device of claim 1, wherein the illuminator and the camera exhibit a horizontal field of view of approximately 55° degrees and a vertical field of view of approximately 43° degrees in a "landscape" configuration and a horizontal field of view of approximately 43° degrees and a vertical field of view of approximately 55° degrees in a "portrait" configuration.

13. A method comprising:
connecting a device to a virtual reality headset and to a portable computing platform having a processor, the device comprising an illuminator, a camera, and a pre-processor;
establishing data and power connection between the device and the portable computing platform;

illuminating a proximity of a user wearing the virtual reality headset with patterned light;
capturing reflections of the patterned light coming from at least one object located in the proximity of the user;
pre-processing of data related to the captured reflections;
providing the pre-processed data to the processor of the portable computing platform;
obtaining, at the processor of the portable computing platform, the pre-processed data from the pre-processor of the device; and
generating a depth map of the at least one object based on the obtained pre-processed data.

14. The method of claim 13, wherein the illuminator and the camera are operating at an infra-red (IR) range.

15. The method of claim 13, further comprising generating a 3D image of the at least one object, based on the depth map and 2D images of the at least one object; and superimposing the 3D image of the at least one object on a virtual reality (VR) scene generated by the processor and viewable by the user.

16. The method of claim 15, wherein the portable computing platform further comprises a visible light camera, and the method further comprising capturing the 2D images of the at least one object using the visible light camera.

17. The method of claim 15, further comprising aligning the 3D image of the at least one object with a viewing angle of the VR scene by the user.

18. The method of claim 13, wherein an overall a power consumption of the device is below approximately 1 Watt.

19. The method of claim 13, wherein the portable computing platform and the virtual reality headset are integrated as a single element.

20. The method of claim 13, wherein the establishing of data and power connection between the device and the portable computing platform is carried out as "Plug and Play".

21. The method of claim 13, wherein the at least one object is a body part of the user.

22. A device connectable to a near eye display and to a portable computing platform having a processor, the device comprising:
an illuminator configured to illuminate a proximity of a user wearing the near eye display with patterned light;
a camera configured to capture reflections of the patterned light coming from at least one object located at the proximity of the user; and
a pre-processor configured to:
perform pre-processing of data related to the captured reflections; and
provide the pre-processed data to the processor of the portable computing platform,
wherein the processor of the portable computing platform is configured to:
establish data and power connection between the device, the near eye display, and the portable computing platform;
obtain the pre-processed data from the pre-processor; and
generate a depth map of the at least one object based on the pre-processed data.

23. The device of claim 22, wherein the processor is further configured to:
generate a 3D image of the at least one object, based on the depth map and 2D images of the at least one object; and
superimpose the 3D image of the at least one object on a virtual reality (VR) scene generated by the processor and viewable by the user over the near eye display.

* * * * *

UNITED STATES PATENT AND TRADEMARK OFFICE
CERTIFICATE OF CORRECTION

| | | |
|---|---|---|
| PATENT NO. | : 9,858,703 B2 | Page 1 of 1 |
| APPLICATION NO. | : 14/975492 | |
| DATED | : January 2, 2018 | |
| INVENTOR(S) | : Kobi Kaminitz et al. | |

It is certified that error appears in the above-identified patent and that said Letters Patent is hereby corrected as shown below:

On the Title Page

Inventors Item (72), Line 2, after "Grossinger," delete "Yosef (IL)" and insert -- Foster City, CA (US) --.

In the Claims

Column 10, Line 56, after "55°" delete "degrees".
Column 10, Line 57, delete "degrees".
Column 10, Line 58, after "43°" delete "degrees".
Column 10, Line 59, after "55°" delete "degrees".
Column 11, Line 27, delete "an overall".

Signed and Sealed this
Sixth Day of November, 2018

Andrei Iancu
*Director of the United States Patent and Trademark Office*